Sept. 19, 1944. J. C. OWENS 2,358,471
TOILET TANK TRIP LEVER
Filed Nov. 4, 1942
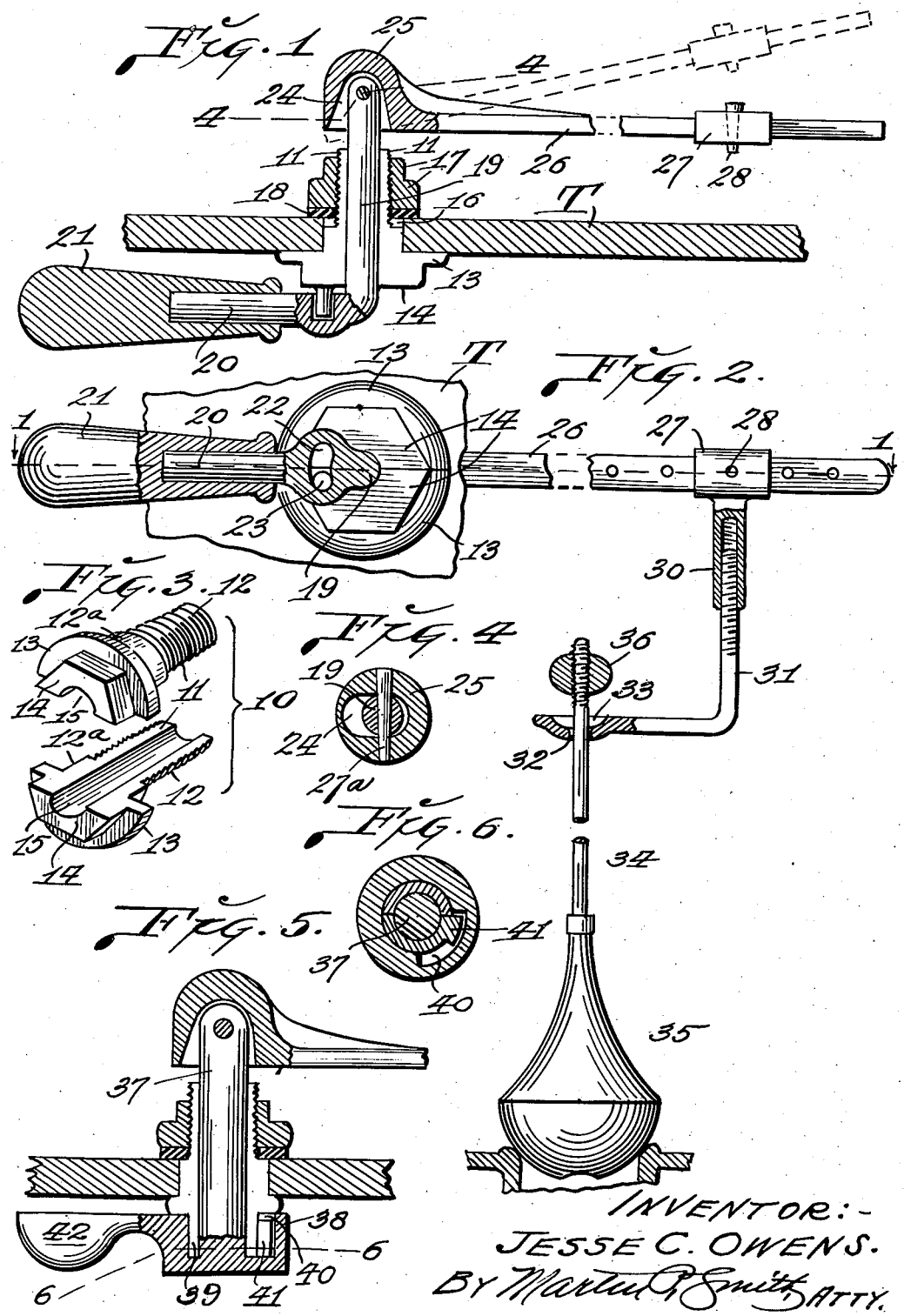
INVENTOR:-
JESSE C. OWENS.
BY Martin R Smith, ATTY.

Patented Sept. 19, 1944

2,358,471

UNITED STATES PATENT OFFICE 2,358,471

TOILET TANK TRIP LEVER

Jesse C. Owens, Los Angeles, Calif.

Application November 4, 1942, Serial No. 464,482

4 Claims. (Cl. 4—67)

My invention relates to toilet tanks and more particularly to the manually operable lever which is used for tripping or unseating the ball valve that controls the discharge of flushing water from the tank and the principal objects of my invention are, to generally improve upon and simplify the existing forms of toilet tank trip levers and to provide an improved structure that is simple, strong and durable, capable of being readily installed for use and also capable of being adjusted with respect to the tank outlet and the valve which normally closes said outlet.

A further object of my invention is, to provide a toilet tank lever, wherein all of the parts thereof, are formed of plastic material that is capable of being readily molded and machined and which material is not subject to the deleterious results of rust and corrosion that usually attend metal, which is subject to practically continuous moisture.

With the foregoing and other objects in view, my invention consists in certain novel features of construction and arrangement of parts that will be hereinafter more fully described and claimed and illustrated in the accompanying drawing in which:

Fig. 1 is a horizontal section showing my improved trip lever installed on the side wall of a toilet tank.

Fig. 2 is a side elevational view of the trip with parts in vertical section.

Fig. 3 is a perspective view of a two part bearing for the crank shaft of the trip.

Fig. 4 is a cross section taken on the line 4—4 of Fig. 1.

Fig. 5 is a horizontal section similar to Fig. 1 and showing a modified construction.

Fig. 6 is a sectional view on line 6—6 of Fig. 5.

Referring by numerals to the accompanying drawing which illustrates a preferred embodiment of my invention, 10 designates a bearing for the trip lever shaft, which bearing may be molded from suitable plastic material and comprises two identical parts, each having a half round body 11, the curved face of which is formed with a thread 12.

Formed integral with one end of each body 11 is a slightly larger body 12a and formed integral with the latter is a segmental flange 13. Formed on the outer face of the flange is one-half of a hexagonal lug 14 and when the parts of the bearing are assembled, the two lugs provide a hexagonal nut which may be engaged by a wrench to screw the bearing into or from the side wall T of a conventional toilet tank.

The flat faces of the bodies 11, 12a, flange 13 and lug 14 are provided with longitudinally disposed channels 15 which combine to form a bearing for the shaft that carries the trip lever.

When applied to the side wall of a toilet tank, the short cylindrical member composed of the bodies 12a occupy an aperture that is formed in said wall, with flange 13 bearing against the outer face of said wall and with threaded body composed of members 11 projecting inwardly through the aperture.

The bearing thus formed is clamped to the tank by a nut 17 mounted on the threaded members 11 with a packing ring or gasket 18 positioned between said nut and wall. While I have shown and described the bearing 10 as being formed into two identical parts, said bearing may if desired, be molded in a single piece. When constructed in two parts as illustrated, said parts may be permanently secured to each other by the use of acetone, or a suitable adhesive applied to the flat faces of said parts.

Mounted for rotation in the bearing formed by channels 15, is a shaft 19 of plastic, and formed integral with the outer end thereof is a short crank arm 20 and mounted on the latter is a handle 21 of plastic.

Formed in the arm 20 adjacent shaft 19 and concentric with the axis thereof, is a short arcuate slot 22, for the accommodation of a pin 23 that projects from the outer face of one of the parts of bearing 10. This construction provides means for limiting the rocking movement of shaft 19 and parts connected thereto.

The inner end of shaft 19 is positioned in a horizontally disposed recess 24 that is formed in the head 25 of a trip lever 26 formed of plastic or the like and a vertically disposed pin 27a passes through said head and the end of the shaft positioned therein, thereby connecting said parts to each other.

Recess 24 is horizontally disposed and widest at its open end, in order that lever 26 may be swung on the vertical axis formed by pin 27a and thus adjusted toward or away from the side wall of the tank, so as to be properly positioned relative to the ball valve controlled outlet from the tank.

Adjustably mounted on lever 26 by means of a pin 28, that passes through any one of a series of spaced apertures in said lever, is a short sleeve 27 from which depends an internally threaded tube 30.

Screw seated in tube 30 is the vertical arm of an L-shaped bracket 31, the end of the horizontal arm thereof being provided with an aperture 32 and with a concave recess 33 formed in the top of said horizontal arm around said aperture.

Arranged to slide freely through aperture 32 is the rod 34 that carries at its lower end, the ball valve 35 which normally closes the flushing water outlet from the tank.

The upper end of valve rod 34 is threaded and screw-seated thereupon is a substantially spherical nut 36, which when bracket 31 is carried upward by trip lever 36, rests in the concave recess 33.

The construction just described, provides ample adjustment between the trip lever 26 and ball valve 35 and also provides an adjustable sliding connection and universal joint between bracket 31 and valve carrying rod 34.

Sleeve 27 and pin 28, bracket 31 and nut 36 are preferably molded from plastic or other non-rusting, non-corroding material.

When my improved tank trip lever is applied to a toilet tank, the parts occupy the positions as illustrated in Figs. 1 and 2, with ball valve 35 resting on its seat around the tank outlet and with nut 36 positioned a short distance above seat 33 in bracket 31.

To actuate lever 26 and lift valve 35 from its seat, handle 21 is pressed down, such movement being limited by the co-operating action of slot 22 and pin 23, and as shaft 19 is rocked in its bearing, lever 26 is swung upward, to elevate bracket 31 and the latter, after moving a short distance upwardly engages nut 36, thereby elevating rod 34 and unseating valve 35.

After pressure on the handle 21 is released, lever 26 and parts connected thereto return to their normal positions, and as the water lowers in the tank, valve 35 will correspondingly lower until it rests upon its seat to close the water outlet.

In the modified structure illustrated in Figs. 5 and 6, a shaft 37 which is mounted for rocking movement in the bearing 10 and which corresponds to shaft 19, has formed integral with its outer end, a cylindrical cap 38 which encloses a short cylindrical member 39 that is formed on the outer ends of the members forming the bearing.

Formed in the cap 38 is an arcuate notch 40 which receives a short lug 41, the latter projecting from one of the parts forming member 39. This construction limits the rocking movement of shaft 37 and the swinging movement of the trip lever carried by said shaft.

Formed integral with and projecting radially from cap 38 is a short arm 42 which functions as an operating handle. In this construction all the parts are preferably formed of plastic substance or the like.

Thus it will be seen that I have provided a toilet tank trip lever that is simple, strong and durable in structure, inexpensive of manufacture and very effective in performing the functions for which it is intended.

The production of all of the parts of the trip lever and associated parts from plastics eliminates the requirements for metal and metal plating and further, the parts of the structure are not subject to rust and corrosion which usually attends metal parts used in and adjacent toilet tanks.

It will be understood that minor changes in the size, form and construction of the various parts of my improved toilet tank flush lever may be made and substituted for those herein shown and described without departing from the spirit of the invention, the scope of which is set forth in the appended claims.

I claim as my invention:

1. The combination with a toilet tank trip lever, of an adjustable bracket adjustably mounted on said trip lever, said bracket having an aperture and a concave recess disposed about said aperture, a ball valve carrying rod passing through said aperture and a substantially spherical nut adjustably mounted on said rod above that portion of the bracket having said aperture and concave recess.

2. The combination with a toilet flush tank, of a two-part bearing removably seated in the side wall of said tank, a crank shaft mounted for rotation on said bearing, cooperating means on said bearing and shaft for limiting the movement of said shaft, a trip lever connected to the inner end of said crank shaft connected for angular adjustment through a horizontal plane by a vertically disposed axis, an adjustable bracket adjustably mounted on said lever and a float suspended from said bracket.

3. The combination with a flushing tank, provided in its bottom with an outlet, of a two part bearing removably positioned in the side wall of said tank, a crank shaft journalled in said bearing, cooperating means on said crank shaft and bearing for limiting the rotary movement of said crank shaft, a lever pivoted for limited horizontal swinging movement on the inner end of said crank shaft, an adjustable bracket adjustably mounted on said lever and a valve suspended for vertical movement from said bracket and adapted to close the outlet opening in the bottom of said tank.

4. The combination with a flushing tank provided in its bottom with an outlet, of a bearing removably positioned in the side wall of the tank, a crank shaft journalled in said bearing, a float carrying lever within the tank, one end of which lever is provided with horizontally disposed V-shaped recess which receives the inner end of said crank shaft, and a tapered pin passing vertically through the recessed end of said lever and through the end of the crank shaft seated therein, for securing said lever to said crank shaft.

JESSE C. OWENS.